United States Patent
Wong et al.

(10) Patent No.: US 10,429,246 B2
(45) Date of Patent: Oct. 1, 2019

(54) PANORAMIC RECONSTRUCTION OF TEMPORAL IMAGING

(71) Applicant: The University of Hong Kong, Hong Kong (CN)

(72) Inventors: Kenneth Kin Yip Wong, Pokfulam (HK); Bowen Li, Kennedy Town (HK)

(73) Assignee: The University of Hong Kong, Hong Kong (CN)

( * ) Notice: Subject to any disclaimer, the term of this patent is extended or adjusted under 35 U.S.C. 154(b) by 0 days.

(21) Appl. No.: 15/792,459

(22) Filed: Oct. 24, 2017

(65) Prior Publication Data

US 2019/0120696 A1 Apr. 25, 2019

(51) Int. Cl.
| | |
|---|---|
| G01J 11/00 | (2006.01) |
| G01J 9/00 | (2006.01) |
| H01S 3/067 | (2006.01) |
| G02B 6/28 | (2006.01) |

(52) U.S. Cl.
CPC ............... G01J 11/00 (2013.01); G01J 9/00 (2013.01); *G02B 6/2861* (2013.01); *H01S 3/06754* (2013.01)

(58) Field of Classification Search
CPC ..... G02B 6/29346; G02B 6/2861; G01J 9/00; G01J 11/00; H01S 3/06754
See application file for complete search history.

(56) References Cited

PUBLICATIONS

Li, Bowen, et al. "Panoramic-reconstruction temporal imaging for seamless measurements of slowly-evolved femtosecond pulse dynamics." Nature communications 8.1 (Jul. 5, 2017): 61. (Year: 2017).*
Dorrer, C. High-speed measurements for optical telecommunication systems. IEEE J. Sel. Topics Quantum Electron.12, 843-858 (2006).
Li, G. Recent advances in coherent optical communication. Adv. Opt. Photon. 1, 279-307 (2009).
Kohler, B., Squier, J., DeLong, K. W., Trebino, R., Yakovlev, V. V. & Wilson, K. R. Phase and intensity characterization of femtosecond pulses from a chirped-pulse amplifier by frequency-resolved optical gating. Opt. Lett. 20, 483-485 (1995).

(Continued)

*Primary Examiner* — Shawn Decenzo
(74) *Attorney, Agent, or Firm* — Leason Ellis LLP

(57) ABSTRACT

The panoramic-reconstruction temporal imaging (PARTI) system is a single-shot optical waveform measurement apparatus that achieves scalable record length and sub-picosecond resolution simultaneously for ultrafast non-repetitive waveform characterization, in analogy with the wisdom of stitching multiple mosaic images to achieve larger-field-of-view in the spatial domain. It consists of a high-fidelity optical buffer, a low-aberration time magnifier and synchronization-control electronics. For specific measurement circumstances, the PARTI system can also be carried out based on a passive optical buffer, which reduces the system complexity. The PARTI system is configured for real-time single-shot characterization of non-repetitive optical dynamic waveform that evolves over a time scale much larger than that of its ultrafast temporal details, i.e., optical dynamics with large time-bandwidth product.

11 Claims, 3 Drawing Sheets
(3 of 3 Drawing Sheet(s) Filed in Color)

(56) References Cited

PUBLICATIONS

Dorrer, C., De Beauvoir, B., Le Blanc, C., Ranc, S., Rousseau, J. P., Rousseau, P. & Salin, F. Single-shot real-time characterization of chirped-pulse amplification systems by spectral phase interferometry for direct electric-field reconstruction. Opt. Lett. 24, 1644-1646 (1999).

Park, Y., Ahn, T. J. & Azaña, J. Real-time complex temporal response measurements of ultrahigh-speed optical modulators. Opt. Express 17, 1734-1745 (2009).

Li, B., Zhang, C., Kang, J., Wei, X., Tan, S. & Wong, K. K. 109 MHz optical tomography using temporal magnification. Opt. Lett. 40, 2965-2968 (2015).

Li, B., Wei, X., Tan, S., Kang, J. & Wong, K. K. Compact and stable temporally magnified tomography using a phase-locked broadband source. Opt. Lett. 41, 1562-1565 (2016).

Herink, G., Jalali B., Ropers, C. & Solli, D. R. Resolving the build-up of femtosecond mode-locking with single-shot spectroscopy at 90 MHz frame rate. Nature Photon. 10, 321-326 (2016).

Wei, X., Zhang, C., Li, B. & Wong, K. K. Y. Observing the spectral dynamics of a mode-locked laser with ultrafast parametric spectrotemporal analyzer. Paper STh3L.4, CLEO 2015, OSA Technical Digest (Optical Society of America, 2015), 2 pages.

Cundiff, S. T. Soto-Crespo, J. M. & Akhmediev, N. Experimental evidence for soliton explosions. Phys. Rev. Lett. 88, 073903 (2002).

Runge, A. F. Broderick, N. G. & Erkintalo, M. Observation of soliton explosions in a passively mode-locked fiber laser. Optica 2, 36-39 (2015).

Solli, D. R., Ropers, C., Koonath, P. & Jalali, B. Optical rogue waves. Nature 450, 1054-1057 (2007).

Suret, P., El Koussaifi, R., Tikan, A., Evain, C., Randoux, S., Szwaj, C. & Bielawski, S. Single-shot observation of optical rogue waves in integrable turbulence using time microscopy. Nat. Commun. 7, 13136 (2016).

Närhi, M., Wetzel, B., Billet, C., Toenger, S., Sylvestre, T., Merolla, J. M., Morandotti, R., Dias F., Genty G., Dudley, J. M. Real-time measurements of spontaneous breathers and rogue wave events in optical fibre modulation instability. Nat. Commun. 7, 13675. (2016).

Kolner, B. Space-time duality and the theory of temporal imaging. IEEE J. Quantum Electron. 30, 1951-1963. (1994).

Bennett, C. V. & Kolner, B. H. Principles of parametric temporal imaging. I. System configurations. J. Quantum Electron. 36, 430-437 (2000).

Salem, R., Foster, M. A. & Gaeta, A. L. Application of space-time duality to ultrahigh-speed optical signal processing. Adv. Opt. Photon. 5, 274-317 (2013).

Broaddus, D. H., Foster, M. A., Kuzucu, O., Turner-Foster, A. C., Koch, K. W., Lipson, M. & Gaeta, A. L. Temporal-imaging system with simple external-clock triggering. Opt. Express 18, 14262-14269 (2010).

Foster, M. A., Salem, R., Geraghty, D. F., Turner-Foster, A. C., Lipson, M. & Gaeta, A. L. Silicon-chip-based ultrafast optical oscilloscope. Nature 456, 81-84 (2008).

Huang, S.-W., Zhou, H., Yang, J., McMillan, J. F., Matsko, A., Yu, M., Kwong, D.-L., Maleki, L. & Wong, C. W. Mode-locked ultrashort pulse generation from on-chip normal dispersion microresonators. Phys. Rev. Lett. 114, 053901 (2015).

Huang, S. W., Yang, J., Lim, J., Zhou, H., Yu, M., Kwong, D. L. & Wong, C. W. A low-phase-noise 18 GHz Kerr frequency microcomb phase-locked over 65 THz. Sci. Rep. 5, 13355 (2015).

Huang, S. W., Yang, J., Yu, M., McGuyer, B. H., Kwong, D. L., Zelevinsky, T. & Wong, C. W. A broadband chip-scale optical frequency synthesizer at 2.7x10-16 relative uncertainty. Sci. Adv. 2, e1501489 (2016).

Pfeifle, J., Coillet, A., Henriet, R., Saleh, K., Schindler, P., Weimann, C., Freude, W., Balakireva, I. V., Larger, L., Koos, C. & Chembo, Y. K. Optimally coherent Kerr combs generated with crystalline whispering gallery mode resonators for ultrahigh capacity fiber communications. Phys. Rev. Lett. 114, 093902 (2015).

Lamont, M. R., Okawachi, Y. & Gaeta, A. L. Route to stabilized ultrabroadband microresonator-based frequency combs. Opt. Lett. 38, 3478-3481 (2013).

Zhou, H., Huang, S. W., Dong, Y., Liao, M., Qiu, K. & Wong, C. W. Stability and intrinsic fluctuations of dissipative cavity solitons in Kerr frequency microcombs. IEEE Photon. J. 7, 1-13 (2015).

Turitsyna, E. G. et al. The laminar-turbulent transition in a fiber laser. Nat. Photon. 7, 783-786. (2013).

Turitsyna, E. G., Falkovich, G. E., Mezentsev, V. K. & Turitsyn, S. K. Optical turbulence and spectral condensate in long-fiber lasers. Phys. Rev. A 80, 031804R (2009).

Walmsley, I. A. & Dorrer, C. Characterization of ultrashort electromagnetic pulses. Adv. Opt. Photon. 1, 308-437 (2009).

Kane, D. J. & Trebino, R. Single-shot measurement of the intensity and phase of an arbitrary ultrashort pulse by using frequency-resolved optical gating. Opt. Lett. 18, 823-825 (1993).

Fontaine, N. K., Scott, R. P., Zhou, L., Soares, F. M., Heritage, J. P. & Yoo, S. J. B.Real-time full-field arbitrary optical waveform measurement. Nature Photon. 4, 248-254 (2010).

Asghari, M. H., Park, Y. & Azaña, J. Complex-field measurement of ultrafast dynamic optical waveforms based on real-time spectral interferometry. Opt. Express 18, 16526-16538 (2010).

\* cited by examiner

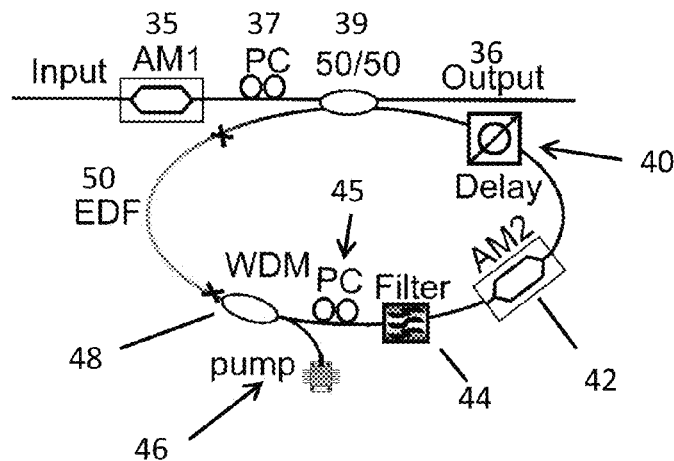
FIG. 3
FIG. 4A
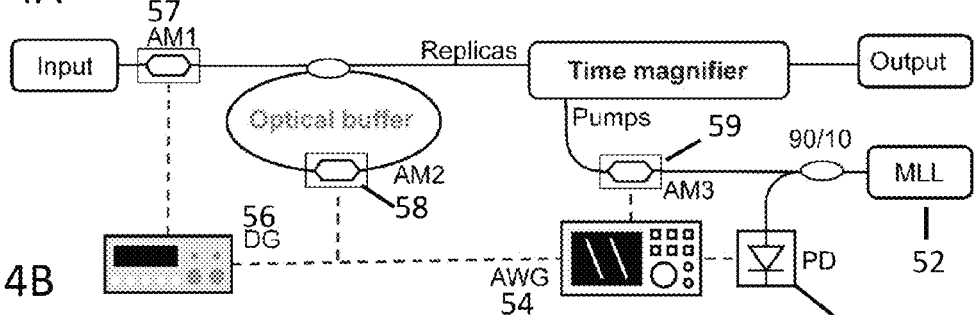
FIG. 4B
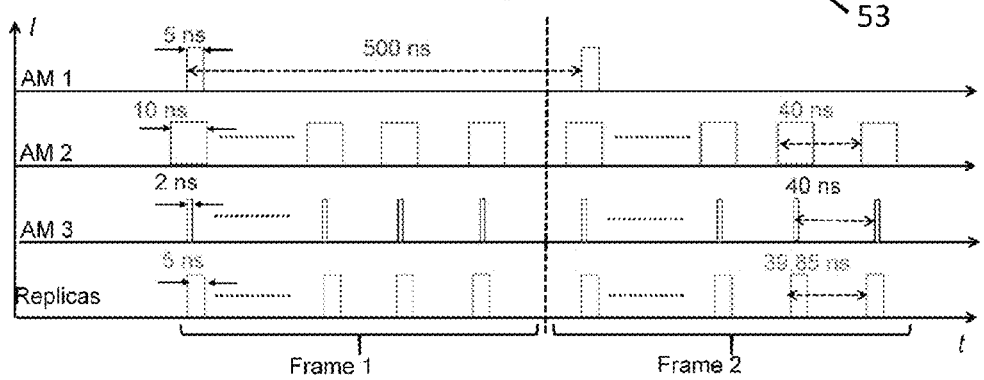

FIG. 5A
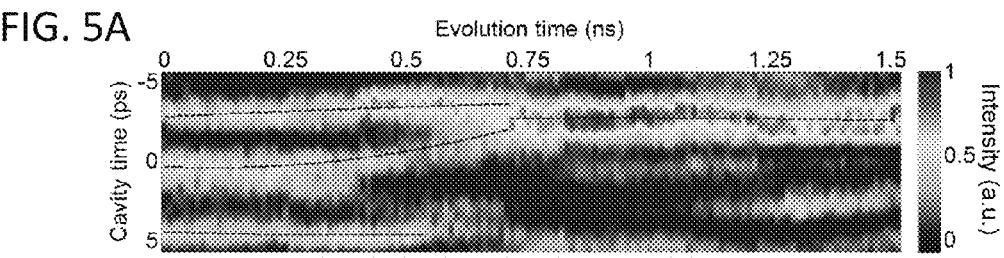
FIG. 5B
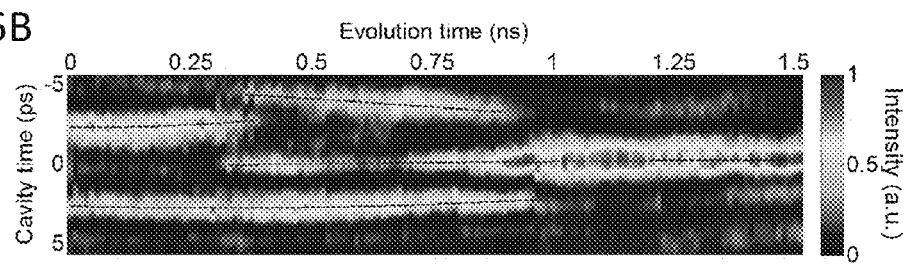
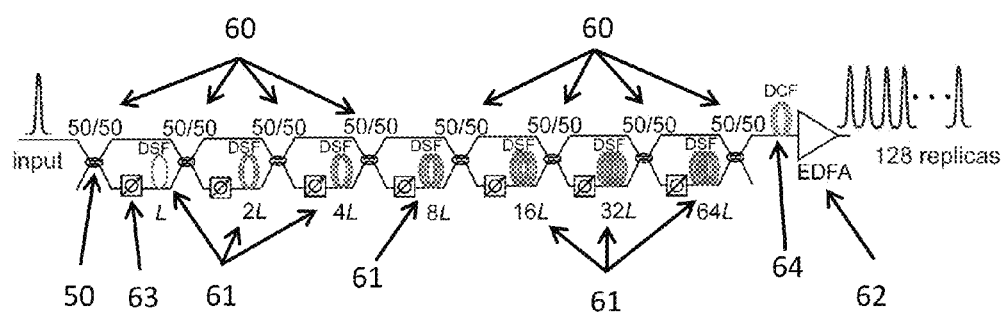
FIG. 6

PANORAMIC RECONSTRUCTION OF TEMPORAL IMAGING

TECHNICAL FIELD

The present invention is generally directed to temporal imaging, and more particularly to the panoramic reconstruction of temporal images.

BACKGROUND OF THE INVENTION

The ability to characterize arbitrary and non-repetitive optical waveforms with sub-picosecond (sub-ps) resolution in single-shot and in real-time is beneficial in different fields, such as advanced optical communication [1, 2], ultrashort pulses generation [3, 4], optical devices evaluation [5] and ultrafast bio-imaging [6, 7]. The references identified in square brackets are listed below and are incorporated herein by reference in their entirety.

More importantly, it has helped reveal fascinating ultrafast phenomena in optics, such as the onset of mode-locking [8, 9], soliton explosions [10-11] and optical rogue waves [12-14]. Temporal imaging system is one of the most promising techniques perceived and developed to meet the needs of single-shot, real-time waveform characterization [15-17]. Based on space-time duality [15-17], quadratic phase modulation (time-lens) and dispersion can be properly combined to significantly increase the time-domain detection bandwidth. On the other hand, just like there are always limitations on the field-of-view in any spatial imaging system, the single-shot record length $\Delta T$ or the temporal aperture of temporal imaging systems has previously been limited to less than 300 ps [18].

Owing to this limitation, the time-bandwidth product ("TBWP"), ratio between the maximum record length $\Delta T$ and temporal resolution $\delta t$ of state-of-the-art temporal imaging systems [19] has not exceeded 450. Such a situation hinders the applications of temporal imaging systems to the study of many important optical nonlinear dynamic phenomena, where not only fine temporal details but also long evolution information are necessary for a comprehensive understanding of the phenomena. For example, studying the dynamics of dissipative Kerr solitons in microresonators [20] is of particular interest because of its potential applications in low-phase noise photonic oscillators [21], broadband optical frequency synthesizers [22], and coherent terabit communications [23]. While the soliton generation benefits greatly from the ultrahigh quality factor (Q) of the microresonator, the ultrahigh Q also renders its formation and transition dynamics slowly evolved at a time scale much longer than the cavity roundtrip time [24, 25], which causes significant challenges in the experimental real-time observation.

Similarly, an optical metrology system that combines the feats of fine temporal resolution and long measurement window is also desired in the study of optical turbulence and laminar-turbulent transition in fiber lasers [26, 27], which leads to a better understanding of coherence breakdown in lasers and laser operation in far-from-equilibrium regimes. To capture comprehensive portraits of these processes, a temporal imaging system with a TBWP much greater than 1,000 is necessary.

Meanwhile, limitations on TBWP also exist for other techniques that achieve comparable performance [28-32]. Single-shot real-time spectral interferometry [32] has been adopted to reconstruct the time-domain information, achieving a temporal resolution ($\delta t$) of 400 fs. However, its temporal record length is limited by the spectral resolution (10 pm) to around 350 ps, which results in a TBWP of 875.

Another measurement technique combines spectral slicing of the optical signal with parallel optical homodyne detection using a frequency comb as a reference [31]. Even though a TBWP larger than 320,000 has been demonstrated at a 160-GHz detection bandwidth, it is practically challenging to scale the detection bandwidth beyond 1 THz (i.e., sub-ps temporal resolution). Acknowledging current existing methods, a waveform measurement technique achieving sub-ps temporal resolution and a scalable record length simultaneously is urgently needed and it would be a powerful tool for studying ultrafast dynamics in different areas.

SUMMARY OF THE INVENTION

The present invention is directed to an ultrafast single-shot waveform characterization system and approach that enable scalable temporal record-length and sub-ps temporal resolution simultaneously, thus breaking through the limitation of time-bandwidth product ("TBWP") in traditional single-shot waveform measurement techniques.

In order to achieve this goal, a panoramic-reconstruction temporal imaging ("PARTI") system is proposed. It is analogous to the wisdom of stitching together multiple mosaic images to achieve a larger field-of-view (panorama) in the spatial domain. The advantages of the PARTI system include: 1) Compared to existing techniques that can achieve sub-ps temporal resolution, the technique of the present invention achieves orders of magnitude longer record length (tens of nanosecond) in a single shot manner. 2) The generalized idea of waveform replication combined with single-shot acquisition is also applicable to other measuring techniques, such as real-time spectral interferometry [32]. Therefore, the technique of the present invention not only represents an advanced temporal imaging system, but also stimulates more analogous innovations in a family of single-shot ultrafast measurement techniques.

The optical buffer in the PARTI system creates multiple identical replicas of the signal under test ("SUT") with a constant time interval, which is subsequently measured by the following time magnifier, thus realizing the temporal scanning on a transient SUT. Using the optical buffer, SUT replicas can be generated with a pre-defined period of $T_1$. If the measurement period of the time magnifier is $T_2$, then in each frame, the time magnifier captures a different section of the long waveform with a step size equal to $|T_1-T_2|$.

The output of the PARTI system represents the magnified waveform corresponding to different sections of the long SUT and is recorded by a high-speed real-time oscilloscope. After data processing, neighboring frames of magnified waveform are stitched together to reconstruct a magnified panoramic image of the original SUT. Therefore, the effective single-shot recording length is scaled by the number of replicas without sacrificing the temporal resolution, thus substantially enhancing the TBWP.

In an exemplary embodiment the apparatus for carrying out the invention includes a fiber-loop based optical buffer that receives a signal under test. The buffer creates multiple identical replicas of the signal under test with a pre-defined period of $T_1$. A time magnifier integrated with the buffer causes temporal scanning using stroboscopic signal acquisition with a constant time interval. The magnifier measures the replicas with a certain time period of $T_2$ and clock and sync electronics synchronize the buffer and magnifier such that if the measurement period of the time magnifier is $T_2$, then in each frame the time magnifier captures a different section of the long waveform of the signal under test with a step size equal to $|T_1-T_2|$. This provides a magnified waveform corresponding to different sections of the signal under test.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other objects and advantages of the present invention will become more apparent upon reference to the following detailed description and annexed drawings in which like designations denote like elements in the various views, and wherein:

FIG. 3 is a set-up of the high-fidelity optical buffer of the system of FIG. 1;

FIGS. 4A and 4B illustrate the synchronization scheme between the optical buffer and the time magnifier of the system of FIG. 1, wherein FIG. 4A illustrates an apparatus set-up and FIG. 4B is an operational timing chart illustrating the realization of synchronization;

FIGS. 5A and 5B illustrate an exemplary result of applying the PARTI system to the study of dissipative Kerr soliton dynamics in a microresonator, wherein FIG. 5A illustrates a soliton evolution process where a triplet soliton state evolves into a singlet soliton state through soliton colliding and FIG. 5B illustrates a different evolution process which starts with a doublet soliton state, has a triplet soliton state in the middle and ends up with a singlet soliton state; and FIG. 6 illustrates the present invention in a passive buffering scheme.

DETAILED DESCRIPTION OF THE INVENTION

Figure 1:
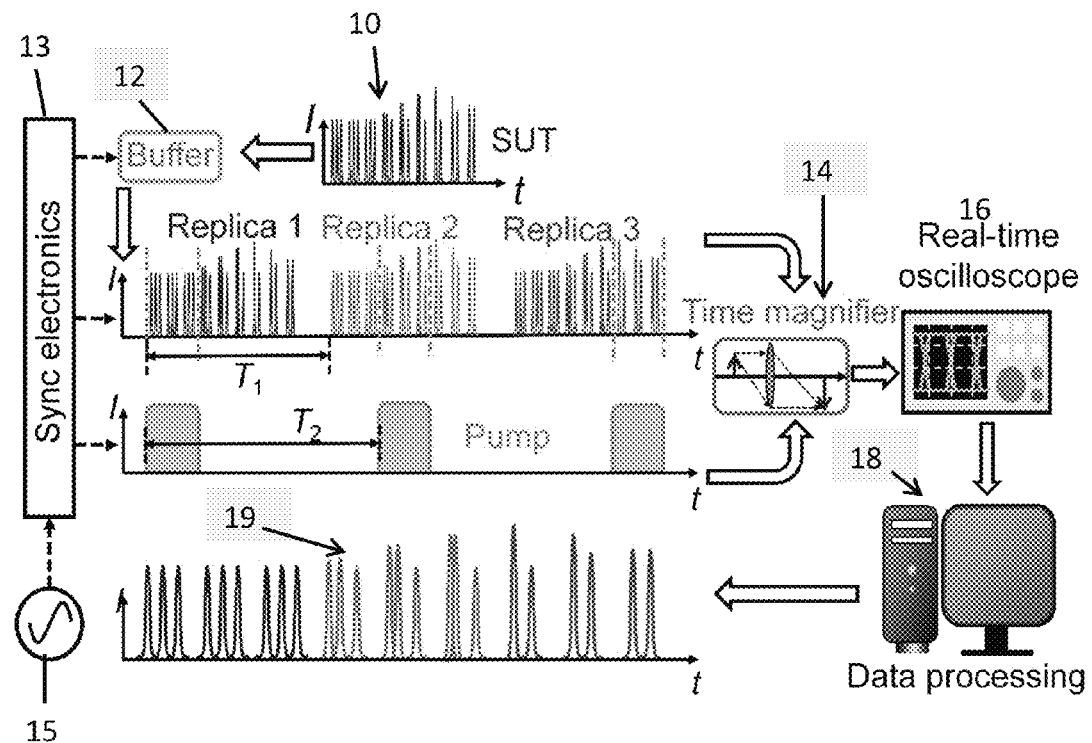
FIG. 1 is a schematic diagram of a PARTI system according to the present invention illustrating the principles of operation.

FIG. 1 shows how the PARTI system overcomes the limitation of TBWP in conventional temporal imaging systems and thus captures slowly-evolved soliton dynamics. The signal under test (SUT) 10 is an exemplary pulse train. Since the SUT is transient and non-repetitive, the concept of image stitching in the spatial domain cannot be conveniently adopted in temporal imaging systems. To address this problem, a fiber-loop based optical buffer 12 is integrated with a time magnifier 14 to realize temporal scanning using stroboscopic signal acquisition, a technique commonly adopted in sampling oscilloscopes. As shown in FIG. 1, the optical buffer 12 in the PARTI system creates multiple identical replicas of the signal under test with a constant time interval. These replicas will be subsequently measured by the time magnifier 14 that follows the buffer. Thus the temporal scanning on a transient SUT is realized.

Using the optical buffer 12, the SUT replicas can be generated with a pre-defined period of $T_1$ as shown in FIG. 1. If the measurement period of the time magnifier 14 is $T_2$, then in each frame, the time magnifier captures a different section of the long waveform with a step size equal to $|T_1-T_2|$. The buffer and time magnifier are synchronized by sync electronics 13 driven by clock 15. The output of the PARTI system represents the magnified waveform corresponding to different sections of the long SUT and is recorded by a high-speed real-time oscilloscope 16. After data processing in computer system 18, neighboring frames of magnified waveform are stitched together to reconstruct a magnified panoramic image 19 of the original SUT. Therefore, the effective single-shot recording length is scaled by the number of replicas without sacrificing the temporal resolution, thus substantially enhancing the TBWP.

Figure 2:
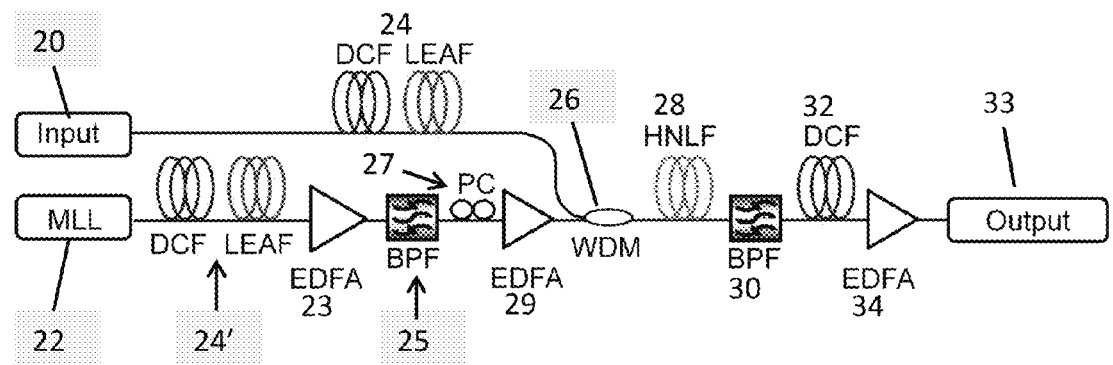
FIG. 2 is a set-up of the low-aberration time magnifier of the system of FIG. 1.

The foundation of the PARTI system is the parametric time magnifier 14 with low aberration. An exemplary embodiment of the time magnifier is shown in FIG. 2. The parametric time lens is implemented through a four-wave mixing (FWM) process in a 50-m highly-nonlinear fiber (HNLF). The FWM process was chosen, as opposed to other parametric processes, because it allows high-quality processing of SUT, pump and output simultaneously in the telecommunication band. In addition, since multiple frames of magnified waveform need to be stitched together to obtain the panoramic image, it is critical to ensure a stable impulse response across the recording window of the time magnifier, i.e. a low-aberration FWM time magnifier. For an in-focus time magnifier, the main aberration comes from the third order dispersion ("TOD") in the dispersive path for input and pump. In order to construct a low-aberration time magnifier, i.e., to minimize the third-order-dispersion-induced aberration, with a long recording length, both the input and the pump dispersions are provided by proper combination of dispersion compensating fiber (DCF) and large effective-area fiber (LEAF). This combination achieves large linear dispersion (fourth and higher order dispersion neglected).

As shown in FIG. 2, both the input dispersion 24 and the pump dispersion 24' are provided by combining DCF and LEAF in devices 24, 24'. Since the LEAF has the opposite dispersion slope [0.08 ps·nm$^{-2}$km$^{-1}$] compared to the DCF [$-0.598$ ps·nm$^{-2}$km$^{-1}$], combining the two types of fiber according to the ratio of their dispersion slope results in linear net dispersion. Moreover, LEAF features in very small dispersion-to-dispersion-slope ratio ($K_{LEAF}$=D/S=45 nm) compared to standard single-mode fiber (SMF) ($K_{SMF}$=D/S=275 nm). Therefore, using a LEAF fiber to compensate the dispersion slope of the DCF sacrifices much less net dispersion compared with using SMF, which facilitates achieving large linear dispersion with moderate insertion loss.

In the system shown in FIG. 2, the input SUT is dispersed for 35 ps$^2$ in device 24 before being combined with the pump through the wavelength-division multiplexer (WDM) 26. In the lower branch of the system, the output of the MLL goes through a dispersion of 71.2 ps$^2$ in device 24' and is then pre-amplified by a low-noise Erbium-doped fiber amplifier ("EDFA") 23. The output of amplifier 23 goes through band-pass filter ("BPF") 25, which selects the spectral component from 1555 nm to 1565 nm. The filter output is passed through polarization controller ("PC") 27 and is subsequently amplified again to 100 mW in EDFA 29 to generate the pump for the time magnifier. The pump and SUT are launched together into the highly-nonlinear fiber (HNLF) 28, and the generated idler is filtered out in BPF 30. The output of filter 30 is passed through the output dispersion DCF 32 (2152.5 ps$^2$) and its output is then amplified again in EDFA 34 to become the final output 33 of the time magnifier.

Overall, the system satisfies the imaging condition $$\frac{-1}{\Phi_1''} + \frac{1}{\Phi_2''} = \frac{1}{\Phi_f''} \qquad (1)$$

where the $\Phi''_1$ (35 ps$^2$), $\Phi''_2$ (2152.5 ps$^2$), and $\Phi''_f$ (−35.6 ps$^2$) are the input, output, and focal group-delay dispersions, respectively, while the minus sign originates from the phase conjugation during the chosen parametric process. Therefore, the temporal magnification ratio is $$M = \frac{\Phi''_2}{\Phi''_1} = 61.5 \qquad (2)$$

In order to generate multiple replicas of SUT for temporal scanning, a fiber-loop based optical buffer is needed as shown in FIG. 3. The buffer generates multiple high fidelity replicas of arbitrary signals under test with a fine-tunable period for subsequent stroboscopic signal acquisition. A SUT is loaded through amplitude modulator ("AM") 35 and polarization controller 37 into the buffer through the 50/50 coupler 39. One replica will be generated when the SUT is circulated for each cavity round trip.

During operation, a section of waveform will be carved out by amplitude modulator 35 (AM1) and loaded into the buffer through the 50/50 coupler 39. After each circulation inside the fiber-loop cavity, 50% of the buffered waveform is coupled out through output 36 as a replica, while the other 50% is circulated for the next round. In the configuration of FIG. 3, the total cavity length is designed to be around 8.2 m and the cavity period can be fine-tuned from 39.7 ns to 40 ns using the optical delay-line 40 in order to match the frame rate of the time magnifier. Amplitude modulator 42 (AM2) functions as a switch by controlling the intra-cavity loss. The switch is turned on only when the SUT passes AM2 and therefore, AM2 controls the number of replicas generated from the buffer 12. More importantly, the periodic switching of AM2 prevents the self-lasing operation of the optical buffer, which substantially suppresses the amplification noise during the buffering. Additionally, a WDM filter 48 with a passband from 1537 nm to 1547 nm further minimizes the buffering noise. A 980-nm laser diode 46 pumping a 2-m erbium-doped fiber (EDF) 50 through WDM 48 provides a maximum gain of around 20 dB to compensate the total cavity loss (≈12 dB). To minimize the dispersion distortion, 0.5-m DCF is added to the cavity. Therefore, the influence of residual net dispersion is small enough to be neglected. Finally, by optimizing the polarization controllers (PC) 37, 45 both outside and inside the cavity, the buffer generates high-fidelity replicas of the input waveform.

The details of the synchronization of the optical buffer and the time magnifier are shown in FIGS. 4A and 4B. In order to emphasize the key components for synchronization, the optical buffer and the time magnifier are shown simplified in the schematic of FIG. 4A. The key electronics can be divided into the following three groups. First of all, a repetition-rate-stabilized femtosecond fiber MLL 52 and a 1.2-GHz photodetector 53 together generate a 250-MHz electrical clock signal, which serves as the time base of the whole system. Secondly, an arbitrary waveform generator (AWG) 54, and a delay generator (DG) 56 create electrical patterns that control the stroboscopic acquisition based on the clock signal. Finally, the three amplitude modulators (AM1, AM2, AM3) convert the electrical patterns to the optical domain, so as to control the input SUT loading (AM1) 57, optical-buffer switching (AM2) 58 and time-magnifier-pump generation (AM3) 59, respectively.

The detailed timing chart of the system is shown in FIG. 4B. The driving patterns for AM1, AM2 and AM3 as well as the generated replicas are shown schematically. The corresponding pulse width and periods are also labelled in the figure. The vertical black dashed line separates the two consecutive frames.

As indicated by the vertical black dashed line, the whole system is operated with a frame rate of 2 MHz as an example. In every 500 ns, AM1 will load from the input a 5-ns-long waveform as the signal under test SUT (first horizontal axis). After the SUT is loaded into the buffer, AM2 will be switched on only when the SUT arrives in each circulation. Therefore, in the second horizontal axis, AM2 opens every 40 ns and generates ten identical replicas in each 500-ns frame. Ideally, the separation between each gating is identical to the cavity period of the buffer (39.85 ns). However, being limited by the sampling speed of AWG (1 Gs·s$^{-1}$), the separation is set as 40 ns. Nevertheless, since each SUT is only circulated 10 times inside the buffer and the gating width (10 ns) is much broader than the SUT duration, the slight mismatch between the gating period and the cavity period will not influence the performance of the buffer.

After the buffering, ten replicas will be generated with a separation equal to the cavity period (fourth horizontal axis). AM3 performs pulse-picking on the MLL to generate a pump for the time magnifier every 40 ns (third horizontal axis). Owing to the period difference (150 ps) between the time magnifier and the SUT replicas, the time magnifier will scan the SUT from left to right with a step of 150 ps, thus realizing the temporal scanning on a long SUT.

Finally, to demonstrate the capabilities of the PARTI system, the system is applied to observe the dynamic evolution of dissipative Kerr solitons inside an ultrahigh-Q microresonator. The final output of the system is detected by an 18-GHz photodetector and then digitized and recorded by a real-time oscilloscope. After data processing on the measurement results, two sections of 1.5-ns-long waveform with a 740-fs resolution are reconstructed, which represent a TBWP of more than 2000. With the unprecedented measurement capability, fascinating dissipative Kerr soliton dynamics in a high-Q microresonator is observed. To clearly visualize the evolution details, a one-dimensional waveform is sectioned according to the cavity roundtrip time (11.29 ps) of the microresonator to rearrange the data into a two-dimensional matrix and create 2D evolution portraits to depict the dissipative Kerr soliton transition dynamics.

In the first case, as shown in FIG. 5A, at the beginning stage (0 ps to around 400 ps); three solitons (triplet state) with almost equal intensity exist in the cavity. After that, in the middle stage (400 ps to around 800 ps), the first two solitons starts to be attracted to each other and eventually merge into a singlet soliton at around 800 ps. The third soliton is shifted upwards during the merging of the other two solitons. However, the third soliton does not survive during the transition and starts to fade after 500 ps. After this transitioning middle stage, a singlet soliton state is achieved inside the cavity, and the state remains for more than 600 ps, or 53 cavity roundtrips. Black dashed curves emphasizing the soliton transition traces are plotted against the 2D portrait, which is obtained by polynomial fitting the peak positions of the solitons.

In addition to the first example, a different dynamic process is also observed which also generates the singlet soliton state eventually but without soliton fusion. As shown in FIG. 5B, in the first stage (0 to around 370 ps) two solitons co-exist in the cavity. In the meantime, the doublet solitons repulse each other slightly and the first soliton gradually fades away. At around 370 ps, the upper soliton disappears, but at the same time two other solitons emerge. In the second stage (370 ps to 1 ns), in contrast to the first stage, the triplet solitons are attracted to the center slowly. At the end of the second stage, both the top and bottom solitons fade away, while the middle one survives and evolves into a singlet soliton with higher intensity in the final stage (1 ns to 1.5 ns). Similar to the first example, the singlet soliton state is much more stable compared to previous states and lasts over 500 ns.

In addition, the PARTI system can also be realized in a passive buffering scheme as shown in FIG. 6. FIG. 6 illustrates a set-up of the optical buffer with eight 50/50 couplers 60 cascaded together to generate 128 replicas from the original SUT with a minimum attenuation of around 21 dB (7×3 dB) on the intensity of each replica. Dispersion-shifted fiber (DSF) sections 61 with precise lengths of L, 2L, 4L, . . . are inserted between each coupling stages to induce required delay among replicas. Under such an approach, the attenuation can be compensated by just one stage of amplifier before launching into the temporal imaging system. In particular, a single stage of amplification using an erbium-doped fiber amplifier ("EDFA") 62 can be placed at the final output port to compensate the attenuation of the signals. This will significantly reduce the noise-induced distortion and therefore greatly extend the potential scalability of the PARTI system. The optical delay in each stage of 50/50 coupler 60 is precisely controlled by dispersion shifted fiber (DSF) 61 and tunable optical delay line 63. Since DSF has almost zero dispersion at 1.5 µm, the main contribution to dispersion comes from the pigtails of the 50/50 couplers, which are made of single-mode fiber ("SMF"). Therefore, the dispersion experienced by each replica is the same and thus can be compensated together by a spool of DCF 64 to eliminate the dispersive distortion.

Since there is no tuning part, once the period of replication is fixed, such a passive scheme significantly reduces the complexity of synchronization between the buffer and the time magnifier, which makes the PARTI system more user-friendly. This alternative embodiment is mostly preferred in circumstances where the PARTI system is applied for the study of a specific phenomenon so that the buffering period can be customized according to the requirement.

REFERENCES

The references listed below are cited throughout the specification and are identified by the corresponding number(s) placed in square brackets [ ]. Each of the following references is incorporated herein by reference in its entirety:

1. Dorrer, C. High-speed measurements for optical telecommunication systems. *IEEE J. Sel. Topics Quantum Electron.* 12, 843-858 (2006).
2. Li, G. Recent advances in coherent optical communication. *Adv. Opt. Photon.* 1, 279-307 (2009).
3. Kohler, B., Squier, J., DeLong, K. W., Trebino, R., Yakovlev, V. V. & Wilson, K. R. Phase and intensity characterization of femtosecond pulses from a chirped-pulse amplifier by frequency-resolved optical gating. Opt. Lett. 20, 483-485 (1995).
4. Dorrer, C., De Beauvoir, B., Le Blanc, C., Ranc, S., Rousseau, J. P., Rousseau, P. & Salin, F. Single-shot real-time characterization of chirped-pulse amplification systems by spectral phase interferometry for direct electric-field reconstruction. Opt. Lett. 24, 1644-1646 (1999).
5. Park, Y., Ahn, T. J. & Azaña, J. Real-time complex temporal response measurements of ultrahigh-speed optical modulators. Opt. Express 17, 1734-1745 (2009).
6. Li, B., Zhang, C., Kang, J., Wei, X., Tan, S. & Wong, K. K. 109 MHz optical tomography using temporal magnification. Opt. Lett. 40, 2965-2968 (2015).
7. Li, B., Wei, X., Tan, S., Kang, J. & Wong, K. K. Compact and stable temporally magnified tomography using a phase-locked broadband source. Opt. Lett. 41, 1562-1565 (2016).
8. Herink, G., Jalali B., Ropers, C. & Solli, D. R. Resolving the build-up of femtosecond mode-locking with single-shot spectroscopy at 90 MHz frame rate. Nature Photon. 10, 321-326 (2016).
9. Wei, X., Zhang, C., Li, B. & Wong, K. K. Y. Observing the spectral dynamics of a mode-locked laser with ultrafast parametric spectro-temporal analyzer. Paper STh3L.4, CLEO 2015, OSA Technical Digest (Optical Society of America, 2015).
10. Cundiff, S. T. Soto-Crespo, J. M. & Akhmediev, N. Experimental evidence for soliton explosions. Phys. Rev. Lett. 88, 073903 (2002).
11. Runge, A. F. Broderick, N. G. & Erkintalo, M. Observation of soliton explosions in a passively mode-locked fiber laser. Optica 2, 36-39 (2015).
12. Solli, D. R., Ropers, C., Koonath, P. & Jalali, B. Optical rogue waves. Nature 450, 1054-1057 (2007).
13. Suret, P., El Koussaifi, R., Tikan, A., Evain, C., Randoux, S., Szwaj, C. & Bielawski, S. Single-shot observation of optical rogue waves in integrable turbulence using time microscopy. Nat. Commun. 7, 13136 (2016).
14. Nirhi, M., Wetzel, B., Billet, C., Toenger, S., Sylvestre, T., Merolla, J. M., Morandotti, R., Dias F., Genty G., Dudley, J. M. Real-time measurements of spontaneous breathers and rogue wave events in optical fibre modulation instability. Nat. Commun. 7, 13675. (2016).
15. Kolner, B. Space-time duality and the theory of temporal imaging. IEEE J. Quantum Electron. 30, 1951-1963. (1994).
16. Bennett, C. V. & Kolner, B. H. Principles of parametric temporal imaging. I. System configurations. J. Quantum Electron. 36, 430-437 (2000).
17. Salem, R., Foster, M. A. & Gaeta, A. L. Application of space-time duality to ultrahigh-speed optical signal processing. Adv. Opt. Photon. 5, 274-317 (2013).
18. Broaddus, D. H., Foster, M. A., Kuzucu, O., Turner-Foster, A. C., Koch, K. W., Lipson, M. & Gaeta, A. L. Temporal-imaging system with simple external-clock triggering. Opt. Express 18, 14262-14269 (2010).
19. Foster, M. A., Salem, R., Geraghty, D. F., Turner-Foster, A. C., Lipson, M. & Gaeta, A. L. Silicon-chip-based ultrafast optical oscilloscope. Nature 456, 81-84 (2008).
20. Huang, S.-W., Zhou, H., Yang, J., McMillan, J. F., Matsko, A., Yu, M., Kwong, D.-L., Maleki, L. & Wong, C. W. Mode-locked ultrashort pulse generation from on-chip normal dispersion microresonators. Phys. Rev. Lett. 114, 053901 (2015).
21. Huang, S. W., Yang, J., Lim, J., Zhou, H., Yu, M., Kwong, D. L. & Wong, C. W. A low-phase-noise 18 GHz Kerr frequency microcomb phase-locked over 65 THz. Sci. Rep. 5, 13355 (2015).
22. Huang, S. W., Yang, J., Yu, M., McGuyer, B. H., Kwong, D. L., Zelevinsky, T. & Wong, C. W. A 23. Pfeifle, J., Coillet, A., Henriet, R., Saleh, K., Schindler, P., Weimann, C., Freude, W., Balakireva, I. V., Larger, L., Koos, C. & Chembo, Y. K. Optimally coherent Kerr combs generated with crystalline whispering gallery mode resonators for ultrahigh capacity fiber communications. Phys. Rev. Lett. 114, 093902 (2015).
24. Lamont, M. R., Okawachi, Y. & Gaeta, A. L. Route to stabilized ultrabroadband microresonator-based frequency combs. Opt. Lett. 38, 3478-3481 (2013).
25. Zhou, H., Huang, S. W., Dong, Y., Liao, M., Qiu, K. & Wong, C. W. Stability and intrinsic fluctuations of dissipative cavity solitons in Kerr frequency microcombs. IEEE Photon. J. 7, 1-13 (2015).
26. Turitsyna, E. G. et al. The laminar-turbulent transition in a fiber laser. Nat. Photon. 7, 783-786. (2013).
27. Turitsyna, E. G., Falkovich, G. E., Mezentsev, V. K. & Turitsyn, S. K. Optical turbulence and spectral condensate in long-fiber lasers. Phys. Rev. A 80, 031804R (2009).
28. Walmsley, I. A. & Dorrer, C. Characterization of ultrashort electromagnetic pulses. Adv. Opt. Photon. 1, 308-437 (2009).
29. Kane, D. J. & Trebino, R. Single-shot measurement of the intensity and phase of an arbitrary ultrashort pulse by using frequency-resolved optical gating. Opt. Lett. 18, 823-825 (1993).
30. Dorrer, C., De Beauvoir, B., Le Blanc, C., Ranc, S., Rousseau, J. P., Rousseau, P. & Salin, F. Single-shot real-time characterization of chirped-pulse amplification systems by spectral phase interferometry for direct electric-field reconstruction. Opt. Lett. 24, 1644-1646 (1999).
31. Fontaine, N. K., Scott, R. P., Zhou, L., Soares, F. M., Heritage, J. P. & Yoo, S. J. B.Real-time full-field arbitrary optical waveform measurement. Nature Photon. 4, 248-254 (2010).
32. Asghari, M. H., Park, Y. & Azafia, J. Complex-field measurement of ultrafast dynamic optical waveforms based on real-time spectral interferometry. Opt. Express 18, 16526-16538 (2010).

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

We claim:

1. A single-shot optical waveform measurement apparatus that achieves scalable record length and sub-picosecond resolution simultaneously for ultrafast non-repetitive waveform characterization comprises:
    a fiber-loop based optical buffer that receives a signal under test, said buffer creating multiple identical replicas of the signal under test with a pre-defined period of $T_1$;
    a time magnifier integrated with the buffer to realize temporal scanning using stroboscopic signal acquisition with a constant time interval, said magnifier measuring the replicas with a certain time period of $T_2$; and
    clock and sync electronics that synchronize the buffer and magnifier such that if the measurement period of the time magnifier is $T_2$, then in each frame, the time magnifier captures a different section of the long waveform of the signal under test with a step size equal to $|T_1-T_2|$ in order to provide a magnified waveform corresponding to different sections of the signal under test.

2. The optical waveform measurement apparatus of claim 1 further including a real time recorder of the magnified waveform and a data processor that stitch together neighboring frames of the magnified waveform in order to reconstruct a magnified panoramic image of the original signal under test.

3. The optical waveform measurement apparatus of claim 2 wherein an effective single-shot recording length is scaled by the number of replicas without sacrificing the temporal resolution, thus substantially enhancing a time-bandwidth product (TBWP) of the apparatus.

4. The optical waveform measurement apparatus of claim 1 wherein the time magnifier comprises:
    a first dispersion compensating fiber (DCF) and large effective area fiber (LEAF) combination for dispersing the signal from the optical buffer;
    a mode-locked laser;
    a second dispersion compensating fiber (DCF) and large effective area fiber (LEAF) combination for dispersing the output of the laser;
    a wavelength-division multiplexer (WDM) that combines the output of the first DCF/LEAF combination and the pump (output of high power EDFA);
    a highly-nonlinear fiber (HNLF) that receives the output of the WDM to generate an idler;
    a first band-pass filter (BPF) that receives the idler output of the HNLF and limits it to a certain spectral component;
    an output dispersion fiber (DCF) that passes the output of the first BPF;
    a first low-noise Erbium-doped fiber amplifier (EDFA) that receives and amplifies the output of the DCF to form the output of the time magnifier.

5. The optical waveform measurement apparatus of claim 4 wherein the pump further includes:
    a second low-noise Erbium-doped fiber amplifier (EDFA) for receiving the output of the second DCF/LEAF combination and pre-amplifying it;
    a second band-pass filter (BPF) for filtering the output of the second EDFA;
    a polarization controller (PC) for controlling the polarization of the output of the second BPF; and
    a high-power Erbium-doped fiber amplifier (EDFA) that amplifies the output of the polarization controller to produce the pump.

6. The optical waveform measurement apparatus of claim 4 wherein the first dispersion compensating fiber (DCF) and large effective area fiber (LEAF) that form the combination are combined according to the ratio of their dispersion slope so as to provide linear net dispersion.

7. The optical waveform measurement apparatus of claim 5 wherein the second BPF selects the spectral component from 1555 nm to 1565 nm.

8. The optical waveform measurement apparatus of claim 1 wherein the fiber-loop optical buffer comprises:
    an amplitude modulator (AM1) for receiving a section of waveform of the signal under test;
    a polarization controller for buffering the output of AM1;

a 50/50 coupler for coupling the output of polarization controller into a fiber loop such that one replica of the signal under test is generated for each cavity round trip of the signal in the loop, said coupler further coupling out 50% of the buffered waveform as a replica of the signal in the loop to an output of the buffer, while the other 50% is circulated for the next round.

9. The optical waveform measurement apparatus of claim 8 wherein the fiber loop comprises:

an optical delay line after the coupler for fine tuning the cavity period of the loop to match a frame rate of the time magnifier;

a second amplitude modulator (AM2) located after the delay line which functions as a switch by controlling the intra-cavity loss, said second amplitude modulator is turned on only when the signal in the loop passes it, such that it controls the number of replicas generated from the buffer;

a wavelength-division multiplexer (WDM) with a particular passband receives the signal from the second amplitude modulator and minimizes the buffering noise; and an erbium-doped fiber (EDF) receives and amplifies the signal in the loop; and a laser pumps the EDF so as to provide a maximum gain to compensate for the total cavity loss.

10. The optical waveform measurement apparatus of claim 9 wherein the fiber loop further includes a bandpass filter and polarization controller in series between the second amplitude modulator and the WDM.

11. The optical waveform measurement apparatus of claim 1 wherein the clock and sync electronics comprise:

a repetition-rate-stabilized femtosecond fiber (MLL);

a photodetector which with the MLL generates an electrical clock signal that serves as the time base of the whole system;

an arbitrary waveform generator (AWG), a delay generator (DG) which with the AWG create electrical patterns that control the stroboscopic acquisition based on the clock signal; and three amplitude modulators (AM1, AM2, AM3) that convert the electrical patterns to the optical domain so as to control (a) the input signal under test loading (AM1), optical-buffer switching (AM2) and time-magnifier-pump generation (AM3), respectively, wherein after the signal under test is loaded into the buffer, AM2 will be switched on only when the SUT arrives in each circulation to generate replicas; and wherein AM3 performs pulse-picking on the MLL to generate a pump for the time magnifier.

* * * * *